United States Patent
Shabtay et al.

(10) Patent No.: US 9,413,972 B2
(45) Date of Patent: Aug. 9, 2016

(54) THIN DUAL-APERTURE ZOOM DIGITAL CAMERA

(71) Applicant: Corephotonics Ltd., Tel-Aviv (IL)

(72) Inventors: Gal Shabtay, Tel Aviv (IL); Ephraim Goldenberg, Ashdod (IL)

(73) Assignee: Corephotonics Ltd., Tel-Aviv (IL)

( * ) Notice: Subject to any disclaimer, the term of this patent is extended or adjusted under 35 U.S.C. 154(b) by 27 days.

(21) Appl. No.: 14/373,500

(22) PCT Filed: Jul. 4, 2014

(86) PCT No.: PCT/IB2014/062854
§ 371 (c)(1),
(2) Date: Jul. 21, 2014

(87) PCT Pub. No.: WO2015/001519
PCT Pub. Date: Jan. 8, 2015

(65) Prior Publication Data
US 2015/0244942 A1    Aug. 27, 2015

Related U.S. Application Data

(60) Provisional application No. 61/842,987, filed on Jul. 4, 2013.

(51) Int. Cl.
*H04N 5/232* (2006.01)
*H04N 9/04* (2006.01)
(Continued)

(52) U.S. Cl.
CPC ............ *H04N 5/23296* (2013.01); *G02B 1/041* (2013.01); *G02B 9/60* (2013.01);
(Continued)

(58) Field of Classification Search
CPC . H04N 5/23296; H04N 5/2257; H04N 5/232; H04N 9/045; H04N 9/907; H04N 5/2254; H04N 5/2258; H04N 2101/00; G02B 7/102; G02B 15/173; G02B 9/60; G02B 13/0045; G02B 13/02; G02B 1/041; G02B 13/00; G02B 13/18; G02B 9/62; G02B 5/005; G02B 9/64; G02B 13/004; G02B 9/12; Y01T 29/49; Y10T 29/4913
See application file for complete search history.

(56) References Cited

U.S. PATENT DOCUMENTS 5,172,235 A    12/1992   Wilm et al.
7,305,180 B2   12/2007   Labaziewicz et al.
(Continued)

FOREIGN PATENT DOCUMENTS

WO    2013105012 A2    7/2013
WO    2014/083489      6/2014
(Continued)

OTHER PUBLICATIONS

PCT/IB2014/062854 Search Report of the international search authority, Feb. 2015.

*Primary Examiner* — Luong T Nguyen
(74) *Attorney, Agent, or Firm* — Nathan & Associates Patent Agents Ltd.; Menachem Nathan

(57) ABSTRACT

A dual-aperture zoom camera comprising a Wide camera with a respective Wide lens and a Tele camera with a respective Tele lens, the Wide and Tele cameras mounted directly on a single printed circuit board, wherein the Wide and Tele lenses have respective effective focal lengths $EFL_W$ and $EFL_T$ and respective total track lengths $TTL_W$ and $TTL_T$ and wherein $TTL_W/EFL_W > 1.1$ and $TTL_T/EFL_T < 1.0$. Optionally, the dual-aperture zoom camera may further comprise an optical OIS controller configured to provide a compensation lens movement according to a user-defined zoom factor (ZF) and a camera tilt (CT) through $LMV = CT \cdot EFL_{ZF}$, where $EFL_{ZF}$ is a zoom-factor dependent effective focal length.

18 Claims, 3 Drawing Sheets

(51) Int. Cl.

| | | |
|---|---|---|
| *H04N 5/225* | (2006.01) | |
| *H04N 9/097* | (2006.01) | |
| *G02B 9/60* | (2006.01) | |
| *G02B 13/00* | (2006.01) | |
| *G02B 13/02* | (2006.01) | |
| *G02B 1/04* | (2006.01) | |
| *G02B 27/00* | (2006.01) | |
| *G02B 27/64* | (2006.01) | |
| *G02B 13/18* | (2006.01) | |
| *G02B 9/62* | (2006.01) | |
| *G02B 5/00* | (2006.01) | |
| *G02B 9/64* | (2006.01) | |
| *G02B 9/12* | (2006.01) | |
| *H04N 101/00* | (2006.01) | |

(52) U.S. Cl.
CPC ......... *G02B 13/009* (2013.01); *G02B 13/0045* (2013.01); *G02B 13/02* (2013.01); *G02B 27/0025* (2013.01); *G02B 27/646* (2013.01); *H04N 5/2254* (2013.01); *H04N 5/2257* (2013.01); *H04N 5/2258* (2013.01); *H04N 9/045* (2013.01); *H04N 9/097* (2013.01); *G02B 5/005* (2013.01); *G02B 9/12* (2013.01); *G02B 9/62* (2013.01); *G02B 9/64* (2013.01); *G02B 13/00* (2013.01); *G02B 13/004* (2013.01); *G02B 13/18* (2013.01); *H04N 2101/00* (2013.01); *Y10T 29/4913* (2015.01)

(56) References Cited

U.S. PATENT DOCUMENTS

| | | | |
|---|---|---|---|
| 7,561,191 B2 | 7/2009 | May et al. | |
| 7,676,146 B2 | 3/2010 | Border et al. | |
| 8,046,026 B2 | 10/2011 | Koh | |
| 8,149,327 B2 | 4/2012 | Lin et al. | |
| 8,439,265 B2 | 5/2013 | Ferren et al. | |
| 8,542,287 B2 | 9/2013 | Griffith et al. | |
| 8,553,106 B2 | 10/2013 | Scarff | |
| 8,660,420 B2 | 2/2014 | Chang | |
| 8,731,390 B2 | 5/2014 | Goldenberg et al. | |
| 8,824,833 B2 | 9/2014 | Dagher et al. | |
| 2008/0030592 A1 | 2/2008 | Border et al. | |
| 2008/0166115 A1 | 7/2008 | Sachs et al. | |
| 2008/0247055 A1* | 10/2008 | Chang | G02B 13/0045 359/687 |
| 2010/0091386 A1* | 4/2010 | Deng | H01L 27/14625 359/773 |
| 2010/0277619 A1 | 11/2010 | Scarff | |
| 2010/0328471 A1* | 12/2010 | Boland | G02B 13/004 348/207.99 |
| 2011/0115965 A1* | 5/2011 | Engelhardt | G02B 13/004 348/345 |
| 2012/0026366 A1* | 2/2012 | Golan | H04N 5/232 348/240.2 |
| 2013/0242181 A1* | 9/2013 | Phoon | G02B 7/04 348/374 |
| 2013/0271649 A1* | 10/2013 | Halliday | H04N 5/2254 348/374 |
| 2015/0029601 A1 | 1/2015 | Dror et al. | |
| 2015/0085174 A1 | 3/2015 | Shabtay et al. | |

FOREIGN PATENT DOCUMENTS

| | | |
|---|---|---|
| WO | 2014199338 A2 | 12/2014 |
| WO | 2015015383 A2 | 2/2015 |

* cited by examiner

THIN DUAL-APERTURE ZOOM DIGITAL CAMERA

CROSS REFERENCE TO RELATED APPLICATIONS

This application is related to and claims priority from U.S. Provisional Patent Application No. 61/842,987 titled "Miniature telephoto lens assembly" and filed Jul. 4, 2013, which is incorporated herein by reference in its entirety.

FIELD

Embodiments disclosed herein relate in general to digital cameras, and more particularly, to thin dual-aperture zoom digital cameras that can be incorporated in a portable electronic product such as a mobile phone.

BACKGROUND

Compact multi-aperture and in particular dual-aperture (also referred to as "dual-lens" or "dual-camera") digital cameras are known. Miniaturization technologies allow incorporation of such cameras in compact portable electronic devices such as tablets and mobile phones (the latter referred to hereinafter generically as "smartphones"), where they provide advanced imaging capabilities such as zoom, see e.g. co-owned PCT patent application No. PCT/IB2013/060356 titled "High-resolution thin multi-aperture imaging systems", which is incorporated herein by reference in its entirety. A two-camera system (exemplarily including a wide-angle (or "Wide") camera and a telephoto (or "Tele") camera) is calibrated in an end product (e.g. in a smartphone) after manufacturing.

System calibration matches Tele and Wide image pixels by capturing in both cameras known objects. This enables faster and more reliable application of fusion between the two cameras, as described in PCT/IB2013/060356. One problem with such cameras may arise from mishaps such as drop impact. The latter may cause a relative movement between the two cameras after system calibration, changing the pixel matching between Tele and Wide images and thus preventing fast reliable fusion of the Tele and Wide images.

Another problem with dual-aperture zoom cameras relates to their height. There is a large difference in the height (also known as total track length or "TTL") of the Tele and Wide cameras. The TTL, see FIG. 1, is defined as the maximal distance between the object-side surface of a first lens element and a camera image sensor plane. In the following, "W" and "T" subscripts refer respectively to Wide and Tele cameras. In most miniature lenses, the TTL is larger than the lens effective focal length (EFL), which has a meaning well known in the art, see FIG. 1. A typical TTL/EFL ratio for a given lens (or lens assembly) is around 1.3. In a single-aperture smartphone camera, EFL is typically 3.5 mm, leading to a field of view of 70-80°. Assuming one wishes to achieve a dual-aperture X2 optical zoom in a smartphone, it would be natural to use $EFL_W$=3.5 mm and $EFL_T$=2× $EFL_W$=7 mm. However, without spatial restrictions, the Wide lens will have an $EFL_W$=3.5 mm and a $TTL_W$ of 3.5×1.3=4.55 mm, while the Tele lens will have $EFL_T$=7 mm and $TTL_T$ of 7×1.3=9.1 mm. The incorporation of a 9.1 mm lens in a smartphone camera would lead to a camera height of around 9.8 mm, which is unacceptable for many smartphone makers. Also the large height difference (approx. 4.55 mm) between the Wide and Tele cameras can cause shadowing and light-blocking problems, see FIG. 2.

A third problem relates to the implementation of standard optical image stabilization (OIS) in a dual-aperture zoom camera. Standard OIS compensates for camera tilt ("CT") by a parallel-to-the image sensor (exemplarily in the X-Y plane) lens movement ("LMV"). Camera tilt causes image blur. The amount of LMV (in mm) needed to counter a given camera tilt depends on the cameras lens EFL, according to the relation LMV=CT*EFL where "CT" is in radians and EFL is in mm. Since as shown above a dual-aperture zoom camera may include two lenses with significantly different EFLs, it is impossible to move both lenses together and achieve optimal tilt compensation for both Tele and Wide cameras. That is, since the tilt is the same for both cameras, a movement that will cancel the tilt for the Wide camera will be insufficient to cancel the tilt for the Tele camera. Similarly, a movement that will cancel the tilt for the Tele camera will over-compensate the tilt cancellation for the Wide camera. Assigning a separate OIS actuator to each camera can achieve simultaneous tilt compensation, but at the expense of a complicated and expensive camera system.

SUMMARY

Embodiments disclosed herein refer to thin dual-aperture zoom cameras with improved drop impact resistance, smaller total thickness, smaller TTL difference between Wide and Tele cameras and improved OIS compensation.

In some embodiments there are provided dual-aperture zoom cameras comprising a Wide camera with a respective Wide lens and a Tele camera with a respective Tele lens, the Wide and Tele cameras mounted directly on a single printed circuit board, wherein the Wide and Tele lenses have respective effective focal lengths $EFL_W$ and $EFL_T$ and respective total track lengths $TTL_W$ and $TTL_T$ and wherein $TTL_W/EFL_W>1.1$ and $TTL_T/EFL_T<1.0$.

In some embodiments, a dual-aperture zoom camera disclosed herein further comprises an OIS controller configured to provide a compensation lens movement according to a camera tilt input and a user-defined zoom factor through LMV=CT*$EFL_{ZF}$, wherein $EFL_{ZF}$ is a "zoom-factor dependent EFL".

In some embodiments, the Tele lens is a lens as described in detail in U.S. provisional patent application No. 61/842,987 and in U.S. patent application Ser. No. 14/367,924, titled "Miniature telephoto lens assembly", both of which are incorporated herein by reference in their entirety.

In some embodiments there are provided methods for manufacturing a dual-aperture zoom camera comprising the steps of providing a Wide camera having a Wide lens with an effective focal length $EFL_W$ and a total track length $TTL_W$, providing a Tele camera having a Tele lens with an effective focal length $EFL_T$ and a total track length $TTL_T$, wherein $TTL_W/EFL_W>1.1$ and wherein $TTL_T/EFL_T<1.0$, and mounting the Wide and Tele cameras directly on a single printed circuit board.

In some embodiments, the methods further comprise the step of configuring an OIS controller of the dual-aperture zoom camera to compensate lens movement of the Wide and Tele lenses according to a camera tilt input and a user-defined zoom factor.

BRIE DESCRIPTION OF THE DRAWINGS

Non-limiting embodiments are herein described, by way of example only, with reference to the accompanying drawings, wherein.

DETAILED DESCRIPTION

Figure 1:
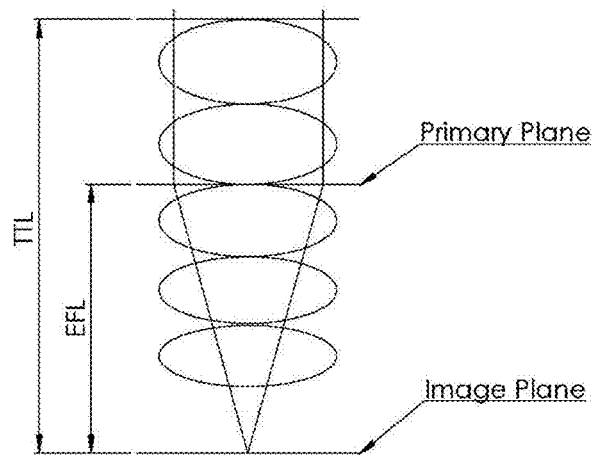
FIG. 1 shows definitions of TTL and EFL.
Figure 2:
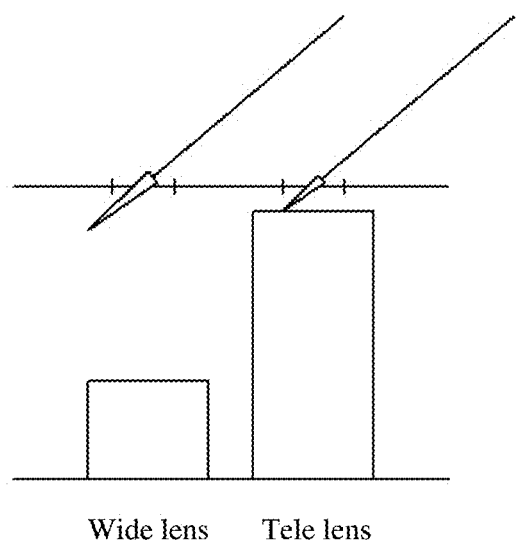
FIG. 2 shows shadowing and light-blocking problems caused by height differences between Wide and Tele cameras in a dual-aperture camera.
Figure 3:
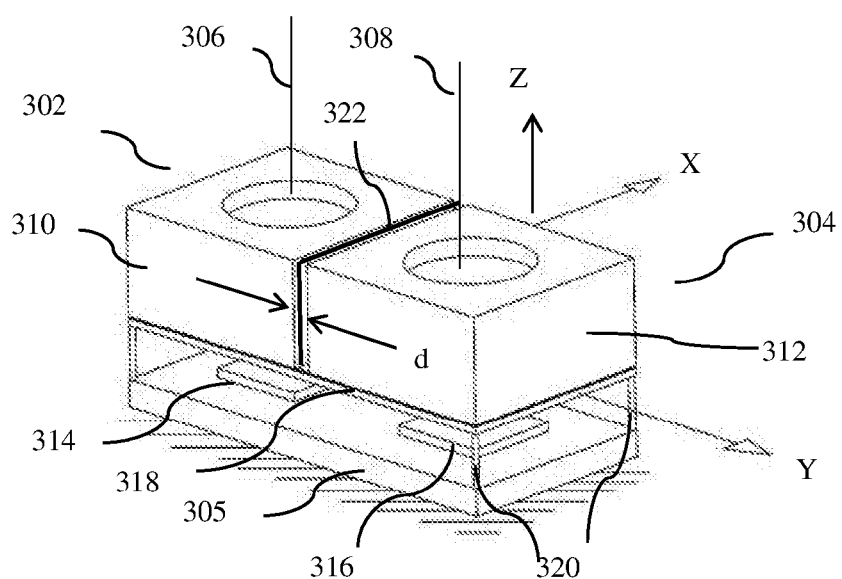
FIG. 3 shows an embodiment of a dual-aperture camera disclosed herein.
Figure 4:
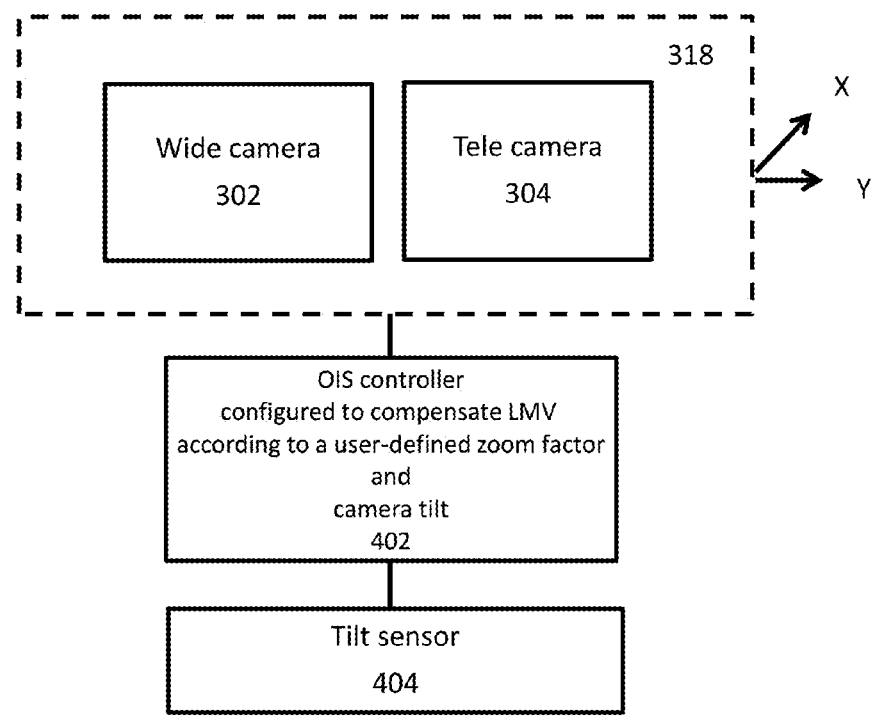
FIG. 4 shows schematically in a block diagram details of the camera embodiment of FIG. 3.

The present inventors have determined that camera movement (due to exemplarily, but not limited to mishaps such as drop impact) can be avoided or minimized by mounting the two cameras directly on a single printed circuit board and by minimizing a distance "d" therebetween. FIG. 3 shows an embodiment of a dual-aperture camera 300 that includes two cameras 302 and 304 mounted directly on a single printed circuit board 306. Each camera includes a lens assembly (respectively 306 and 308), an actuator (respectively 310 and 312) and an image sensor (respectively 314 and 316). The two actuators are rigidly mounted on a rigid base 318 that is flexibly connected to the printed board through flexible elements 320. Base 318 is movable by an OIS mechanism (not shown) controlled by an OIS controller 402 (FIG. 4). The OIS controller is coupled to, and receives camera tilt information from, a tilt sensor (exemplarily a gyroscope) 404 (FIG. 4). More details of an exemplary OIS procedure as disclosed herein are given below with reference to FIG. 4. The two cameras are separated by a small distance "d", typically 1 mm. This small distance between cameras also reduces the perspective effect, enabling smoother zoom transition between cameras.

In some embodiments and optionally, a magnetic shield plate 322 as described in co-owned patent application Ser. No. 14/365,718 titled "Magnetic shielding between voice coil motors in a dual-aperture camera", which is incorporated herein by reference in its entirety, may be inserted in the gap with width d between the Wide and Tele cameras.

In general, camera dimensions shown in FIG. 3 may be as follows: a length L of the camera (in the Y direction) may vary between 13-25 mm, a width W of the camera (in the X direction) may vary between 6-12 mm, and a height H of the camera (in the Z direction, perpendicular to the X-Y plane) may vary between 4-12 mm. More typically in a smartphone camera disclosed herein, L=18 mm, W=8.5 mm and H=7 mm.

The present inventors have further determined that in some embodiments, the problem posed by the large difference in the TTL/EFL ratio of known dual-aperture camera Tele and Wide lenses may be solved through use of a standard lens for the Wide camera ($TTL_W/EFL_W > 1.1$, typically 1.3) and of a special Tele lens design for the Tele camera ($TTL_T/EFL_T < 1$, typically 0.87). Exemplarily, the special Tele lens design may be as described in co-owned and U.S. patent application Ser. No. 14/367,924, titled "Miniature telephoto lens assembly", which is incorporated herein by reference in its entirety. A Tele lens assembly described in detail therein comprises five lenses that include, in order from an object side to an image side: a first lens element with positive refractive power having a convex object-side surface, a second lens element with negative refractive power having a thickness $d_2$ on an optical axis and separated from the first lens element by a first air gap, a third lens element with negative refractive power and separated from the second lens element by a second air gap, a fourth lens element having a positive refractive power and separated from the third lens element by a third air gap, and a fifth lens element having a negative refractive power, separated from the fourth lens element by a fourth air gap, the fifth lens element having a thickness $d_5$ on the optical axis. The lens assembly may exemplarily have an F number (F#) <3.2. In an embodiment, the focal length of the first lens element f1 is smaller than $TTL_T/2$, the first, third and fifth lens elements have each an Abbe number greater than 50, the second and fourth lens elements have each an Abbe number smaller than 30, the first air gap is smaller than $d_2/2$, the third air gap is greater than $TTL_T/5$ and the fourth air gap is smaller than $1.5d_5$. In some embodiments, the surfaces of the lens elements may be aspheric.

Using a Tele lens designed as above, $TTL_T$ is reduced to 7×0.87=6.09 mm, leading to a camera height of less than 7 mm (acceptable in a smartphone). The height difference (vs. the Wide camera) is also reduced to approx. 1.65 mm, causing less shadowing and light blocking problems.

In some embodiments of a dual-aperture camera disclosed herein, the ratio "e"=$EFL_T/EFL_W$ is in the range 1.3-2.0. In some embodiments, the ratio $TTL_T/TTL_W < 0.8e$. In some embodiments, $TTL_T/TTL_W$ is in the range 1.0-1.25. In general, in camera embodiments disclosed herein, $EFL_W$ may be in the range 2.5-6 mm and $EFL_T$ may be in the range 5-12 mm.

With reference now to FIG. 4, in operation, tilt sensor 404 dynamically measures the camera tilt (which is the same for both the Wide and Tele cameras). OIS controller 402, which is coupled to the actuators of both cameras through base 318, receives a CT input from the tilt sensor and a user-defined zoom factor, and controls the lens movement of the two cameras to compensate for the tilt. The LMV is exemplarily in the X-Y plane. The OIS controller is configured to provide a LMV equal to $CT*EFL_{ZF}$, where "$EFL_{ZF}$" is chosen according to the user-defined ZF. In an exemplary OIS procedure, when ZF=1, LMV is determined by the Wide camera $EFL_W$ (i.e. $EFL_{ZF}=EFL_W$ and $LMV=CT*EFL_W$). Further exemplarily, when ZF>e (i.e. $ZF>EFL_T/EFL_W$), LMV is determined by $EFL_T$ (i.e. $EFL_{ZF}=EFL_T$ and $LMV=CT*EFL_T$). Further exemplarily yet, for a ZF between 1 and e, the $EFL_{ZF}$ may shift gradually from $EFL_W$ to $EFL_T$ according to $EFL_{ZF}=ZF*EFL_W$. As mentioned, the OIS procedure above is exemplary, and other OIS procedures may use other relationships between $EFL_{ZF}$ and ZF to provide other type of LMV.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A dual-aperture zoom camera, comprising:
   a) a Wide camera with a respective Wide lens and a Tele camera with a respective Tele lens, the Wide and Tele cameras mounted directly on a single printed circuit board, wherein the Wide and Tele lenses have respective effective focal lengths $EFL_W$ and $EFL_T$ and respective total track lengths $TTL_W$ and $TTL_T$, wherein $TTL_W/EFL_W > 1.1$ and $TTL_T/EFL_T < 1.0$, wherein $EFL_T/EFL_W = e$, and wherein e is in the range 1.3-2.0; and
   b) an optical image stabilization (OIS) mechanism configured to provide a compensation lens movement (LMV) according to a camera tilt (CT) input and a user-defined zoom factor (ZF) through $LMV=CT \times EFL_{ZF}$, wherein CT is a camera tilt in radians and $EFL_{ZF}$ is a zoom-factor dependent effective focal length in millimeters.

2. The dual-aperture zoom camera of claim 1, wherein for ZF=1, $EFL_{ZF}=EFL_W$.

3. The dual-aperture zoom camera of claim 1, wherein for ZF=e, $EFL_{ZF}=EFL_T$.

4. The dual-aperture zoom camera of claim 1, wherein for a ZF in the range 1<ZF<e, $EFL_{ZF}=ZF \times EFL_W$.

5. The dual-aperture zoom camera of claim 1, wherein for a ZF in the range ZF>e, $EFL_{ZF}=EFL_T$.

6. The dual-aperture zoom camera of claim 1, wherein a ratio $TTL_T/TTL_W$ is in the range 1.0-1.25.

7. The dual-aperture zoom camera of claim 1, wherein a ratio $TTL_T/TTL_W$ is smaller that $0.8 \times (EFL_T/EFL_W)$.

8. The dual-aperture zoom camera of claim 1, having a dual-aperture zoom camera height of less than 7 mm.

9. A dual-aperture zoom camera, comprising:
   a) a Wide camera with a respective Wide lens and a Tele camera with a respective Tele lens, the Wide and Tele cameras mounted directly on a single printed circuit board, wherein the Wide and Tele lenses have respective effective focal lengths $EFL_W$ and $EFL_T$ and respective total track lengths $TTL_W$ and $TTL_T$ and wherein $TTL_W/EFL_W>1.1$ and $TTL_T/EFL_T<1.0$,
   wherein the Tele lens comprises a first lens element with positive refractive power having a convex object-side surface, a second lens element with negative refractive power having a thickness $d_2$ on an optical axis and separated from the first lens element by a first air gap, a third lens element with negative refractive power and separated from the second lens element by a second air gap, a fourth lens element having a positive refractive power and separated from the third lens element by a third air gap, and a fifth lens element having a negative refractive power, separated from the fourth lens element by a fourth air gap, the fifth lens element having a thickness $d_5$ on the optical axis; and
   b) a single magnetic shield plate positioned between the Wide and Tele cameras, wherein the single magnetic shield plate has a plate length and a plate height no larger than a respective length and height of either of the Wide or Tele cameras,
   wherein a focal length of the first lens element f1 is smaller than $TTL_T/2$, the first, third and fifth lens elements have each an Abbe number greater than 50, the second and fourth lens elements have each an Abbe number smaller than 30, the first air gap is smaller than $d_2/2$, the third air gap is greater than $TTL_T/5$ and the fourth air gap is smaller than $1.5d_5$.

10. A method for manufacturing a dual-aperture zoom camera comprising the steps of:
    a) providing a Wide camera having a Wide lens with an effective focal length (EFL) $EFL_W$ and a total track length (TTL) $TTL_W$;
    b) providing a Tele camera having a Tele lens with an effective focal length $EFL_T$ and a total track length $TTL_T$, wherein $TTL_W/EFL_W>1.1$ and $TTL_T/EFL_T<1.0$, wherein $EFL_T/EFL_W=e$ and wherein e is in the range 1.3-2.0;
    c) mounting the Wide and Tele cameras directly on a single printed circuit board; and
    d) configuring an optical image stabilization (OIS) controller of the dual-aperture zoom camera to compensate lens movement (LMV) of the Wide and Tele lenses according to a camera tilt (CT) input in radians and a user-defined zoom factor (ZF), wherein $LMV=CT \times EFL_{ZF}$ and wherein $EFL_{ZF}$ is a zoom-factor dependent effective focal length in millimeters.

11. The method of claim 10, wherein for ZF=1, $EFL_{ZF}=EFL_W$.

12. The method of claim 10, wherein for ZF=e, $EFL_{ZF}=EFL_T$.

13. The method of claim 10, wherein for a ZF in the range 1<ZF<e, $EFL_{ZF}=ZF \times EFL_W$.

14. The method of claim 10, wherein for a ZF in the range ZF>e, $EFL_{ZF}=EFL_T$.

15. The method of claim 10, wherein a ratio $TTL_T/TTL_W$ is in the range 1.0-1.25.

16. The method of claim 10, wherein a ratio $TTL_T/TTL_W$ is smaller than $0.8 \times (EFL_T/EFL_W)$.

17. The method of claim 10, wherein the step of providing the Tele camera having the Tele lens with the effective focal length $EFL_T$ and the total track length $TTL_T$ includes providing a Tele lens comprising a first lens element with positive refractive power having a convex object-side surface, a second lens element with negative refractive power having a thickness $d_2$ on an optical axis and separated from the first lens element by a first air gap, a third lens element with negative refractive power and separated from the second lens element by a second air gap, a fourth lens element having a positive refractive power and separated from the third lens element by a third air gap, and a fifth lens element having a negative refractive power, separated from the fourth lens element by a fourth air gap, the fifth lens element having a thickness $d_5$ on the optical axis.

18. The method of claim 17, wherein the focal length of the first lens element f1 is smaller than $TTL_T/2$, the first, third and fifth lens elements have each an Abbe number greater than 50, the second and fourth lens elements have each an Abbe number smaller than 30, the first air gap is smaller than $d_2/2$, the third air gap is greater than $TTL_T/5$ and the fourth air gap is smaller than $1.5d_5$.

* * * * *